JOHN E. EARLE.

Improvement in Clothes Frame.

D B 4,504. Reissued August 8, 1871.

John E. Earle
Inventor

Witnesses

John H. Shumway

A. J. Tibbits

AM. PHOTO-LITHOGRAPHIC CO. N.Y. (OSBORNE'S PROCESS.)

UNITED STATES PATENT OFFICE.

JOHN E. EARLE, OF NEW HAVEN, CONNECTICUT, ASSIGNOR, BY MESNE ASSIGNMENTS, TO PETER R. CARLL, OF SAME PLACE.

IMPROVEMENT IN CLOTHES-FRAMES.

Specification forming part of Letters Patent No. 36,994, dated November 25, 1862; reissue No. 4,504, dated August 8, 1871.

DIVISION B.

*To all whom it may concern:*

Be it known that I, JOHN E. EARLE, of New Haven, in the county of New Haven and State of Connecticut, have invented a new Improvement in Clothes-Frame; and I do hereby declare the following, when taken in connection with the accompanying drawing and the letters of reference marked thereon, to be a full, clear, and exact description of the same, and which said drawing constitutes part of this specification, and represents, in—

Figure 1:
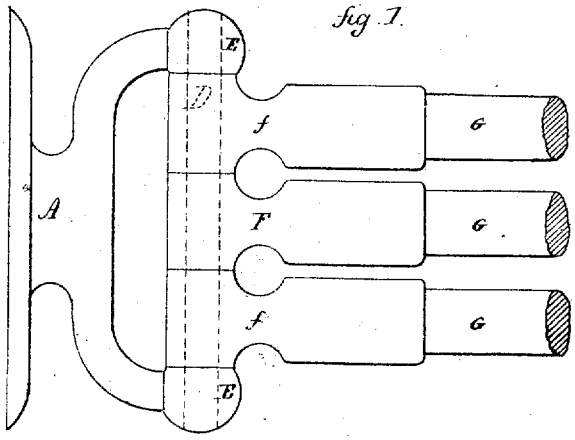
Figure 2:
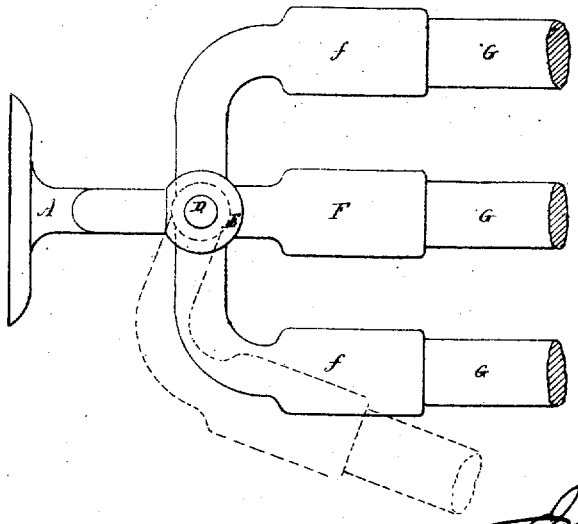

Figure 1 a side view, and in Fig. 2 a top view.

This invention relates to a device especially designed to be used in connection with or near wash-basins for hanging towels in convenient position for use; and consists in the arrangement of two or more bars upon a vertical rod or pintle supported in a bracket, having connections between the bars and pintle, formed substantially as hereinafter described, so that when the bars are parallel to each other they are not in the same vertical plane.

A is the bracket, constructed with arms or heads E, between which, vertically, extends a rod or pintle, D, upon which the bars are hung. By preference I form sockets to receive wooden bars G, and these sockets are here represented as three in number, *f f* F. As these bars are necessarily near together, articles hung upon one bar would interfere with those upon another. In order that the articles upon all the bars may hang free, and the bars yet be parallel one to the other, I construct connections between the bars, so that while one may project directly from the bracket the next connection is carried by a bent arm to the right or left of the said central line, and yet parallel when in a certain position, as shown in Fig. 2, or the central bar may be omitted and the two bars carried out at a less distance, and the other bars, if any, at a greater distance. This would be the case with four bars; thus, when the bars are in a parallel line with each other in all positions, they are not in the same vertical plane; consequently, articles on one bar hang down independently of and not interfering with the articles on the bar below.

While I believe the better plan for the attachment of wood bars is to construct the sockets tubular and insert the bars therein, I do not wish to confine myself to that particular arrangement, as other means of connection may be employed, and the sockets themselves extended to form the arms or bars.

I claim as my invention—

A clothes-frame or bar, consisting of two or more bars arranged upon a vertical rod or pintle supported in a bracket, when the connection of the said bar to the pintle is made in the manner substantially as described, so that when the said bars are parallel to each other they are not in the same vertical plane.

JOHN E. EARLE.

Witnesses:
A. J. TIBBITS,
J. H. SHUMWAY.